United States Patent [19]

Anvari et al.

[11] Patent Number: 5,203,025
[45] Date of Patent: Apr. 13, 1993

[54] SELECTION CIRCUIT IN A SPACE DIVERSITY RECEPTION SYSTEM FOR A MOBILE RECEIVER

[75] Inventors: Kiomars Anvari; Glyn Roberts, both of Calgary, Canada

[73] Assignee: KovAtel Communications, Ltd., Alberta, Canada

[21] Appl. No.: 612,252

[22] Filed: Nov. 9, 1990

[51] Int. Cl.$^5$ ............................................. H04B 1/06
[52] U.S. Cl. ................................... 455/134; 455/137; 455/139; 455/277.1
[58] Field of Search ............... 455/134, 133, 135, 136, 455/137, 139, 52, 54, 56, 273, 275, 276, 277, 226

[56] References Cited

U.S. PATENT DOCUMENTS

| | | | |
|---|---|---|---|
| 3,095,538 | 10/1960 | Silberstein | 325/4 |
| 3,593,147 | 7/1971 | Gurak et al. | 455/276 |
| 3,963,988 | 6/1976 | Niethammer | 325/56 |
| 3,978,408 | 8/1976 | Gupta et al. | 325/56 |
| 4,015,205 | 3/1977 | Ikeda et al. | 325/304 |
| 4,027,247 | 5/1977 | Aranguren | 325/305 |
| 4,057,758 | 11/1977 | Hattori et al. | 455/52 |
| 4,349,914 | 9/1982 | Evans | 335/40 |
| 4,386,435 | 5/1983 | Ulmer et al. | 455/139 |
| 4,450,585 | 5/1984 | Bell | 455/135 |
| 4,499,606 | 2/1985 | Rambo | 455/277 |
| 4,566,133 | 1/1986 | Rambo | 455/277 |
| 4,633,519 | 12/1986 | Gotoh et al. | 455/277 |
| 4,805,229 | 2/1989 | Mobley | 455/137 |
| 4,856,080 | 8/1989 | Huckko | 455/139 |
| 4,972,434 | 11/1990 | LePolozec et al. | 455/139 |

OTHER PUBLICATIONS

Technology article entitled "Code Division Multiple Access," Fred Baumgartner, Feb. 1990, pp. 28-32.
IEEE Communications Magazine article entitled "Multiple Access Communications Networks," Victor O. K. Li, Jun., 1987, vol. 25, No. 6, pp. 41-47.
IEEE article entitled "Bit Error Rates of Selection Diversity Systems in Rayleigh Fading Channels," Cyril Leung, 1981.
IEEE, "Impact of Frequency-Selective Fading in Mobile Radio Communication on Binary and Quadrature Phase Modulation at Transmission Rates of Several Hundred KBPS," Rudolf Werner Lorenz, 1986, pp. 1115-1119.
Electronics & Wireless World article entitled "Developments in Cellular Radio," Richard Lambley, Jun. 1984, pp. 31-33.
IEEE, "Diversity Improvement in Frequency Hopping Multilevel FSK Systems Under the Influence of Rayleigh Fading and Log-Normal Shadowing," Muammari et al., 1982, pp. 94-98.
IEEE article entitled "An IF Combiner for Digital and Analog Radio Systems," Richard A. Nicholos, 1982.
IEEE article entitled "Decision Feedback Equalization for Multipath Induced Interference in Digital Microwave LOS Links," Taylor et al., 1984, pp. 267-279.

Primary Examiner—Reinhard J. Eisenzopf
Assistant Examiner—Edward Urban
Attorney, Agent, or Firm—Cesari and McKenna

[57] ABSTRACT

A selection system in a space diversity system of a mobile receiver combines the ultra high frequency signals after they have been frequency shifted to an intermediate frequency. The system combines the intermediate frequency signals depending on the ratio of the magnitudes of these signals. If the ratio of the magnitude of the received signals is equal to or greater than a preset magnitude level, for example, 5 db, a control unit selects only the received signal having the largest magnitude. Otherwise, the control unit linearly combines both received signals Specifically, if the absolute value of the difference in received phase signals is less than 90°, the output of a phase detector causes the control unit to pass both received signals to a summer that linearly combines them prior to demodulation. Otherwise, the control unit inverts the phase of one of the received signals prior to passing both received signals to the summer.

9 Claims, 1 Drawing Sheet

SELECTION CIRCUIT IN A SPACE DIVERSITY RECEPTION SYSTEM FOR A MOBILE RECEIVER

FIELD OF THE INVENTION

This invention relates to selection circuitry in a space diversity system of a mobile receiver which combines intermediate frequency signals dependent on the magnitude and the phase of these signals

BACKGROUND OF THE INVENTION

The propagation of ultra high frequency electromagnetic energy from a transmitter to a mobile receiver, i.e., such as cellular telephones, in an urban environment takes place largely by way of scattering. The transmitter generates radio signals which are reflected by physical terrain features, i.e., usually buildings, and refracted by the inhomogeneities in the atmosphere before reaching a mobile receiver. Accordingly, the signal received by the mobile receiver is the vector sum of many waves that arrive by multiple paths which cause fading of the received electromagnetic energy according to a Rayleigh distribution.

Diversity transmission combats such multipath fading. The basic premise behind diversity transmission is tat the proper combination of a number of different transmission paths all carrying the same information will greatly improve the reliability of communication between the transmitter and the mobile receiver. There are basically three different types of diversity transmissions. Space diversity uses one transmitting antenna and several receiving antennas that are spaced apart so that fading on either antenna is not correlated. Time diversity repeats the same message, after an appropriate time period, between a transmitting antenna and a receiving antenna. Finally, frequency diversity transmits the message between the transmitting and the receiving antenna using several frequencies, sufficiently spaced to have uncorrelated fading, to achieve independent diversity branches.

Space diversity systems have been proposed for use in mobile receivers because of their simplicity of design and ease of manufacture. A system of this type can use one of three different methods for combining the received signals. Maximal-ratio combining method achieves, under ideal operation, the best performance improvement of these methods. However, it requires cophasing circuitry, weighting circuitry, and summing circuitry, which results in a relatively complicated design. The equal-gain combining method, as shown in U.S. Pat. No. 4,386,435 to Ulmer et al., requires cophasing circuitry and summing circuitry, but the weighting circuitry is omitted. For mobile receiver applications, such as cellular telephones, both the maximal-ratio and the equal-gain combining methods are unsuitable because of the technical difficulty in realizing cophasing circuitry having a precise and stable tracking performance in a rapidly changing multiphase fading environment, such as encountered with moving vehicles.

The selection method appears to hold the most promise in mobile receiver applications because of its stable operation in fast multipath fading environments and its simple implementation. In this method, the diversity branch having the highest signal level is selected. However, to date, the cellular telephone industry has not yet applied the selection method at IF to a space diversity system to combat the multipath fading that occurs between the transmitter and a mobile receiver.

SUMMARY

A primary object of the present invention is to provide a high speed link in a fading environment between a base station and a mobile receiver.

Another object of the present invention is to provide selection in a space diversity system of a mobile receiver without the redundant IF or demodulator sections.

A selection system according to this invention combines the signals received by various antennas after they have been frequency shifted to an intermediate frequency range. The system combines the intermediate frequency signals depending on the ratio of the magnitudes of these signals. Specifically, if the ratio of the magnitude of the received signals from a pair of antennas is equal to or greater than a preset magnitude level, for example, 5 db, a control unit selects only the received signal having the largest magnitude. Otherwise, the control unit linearly combines both received signals.

Specifically, an amplifier in each branch of the space diversity system receives a signal from a separate antenna and generates therefrom signals which are indicative of the magnitude and the phase of the received signal. The phase signal of each amplifier in each branch is applied to a phase detector which generates a phase difference signal indicative of the phase difference between the received phase signals. If the absolute value of the difference in received phase signals is between 0° and 90°, the output of the phase detector causes the control unit to pass both received signals to a summer that linearly combines them prior to demodulation. Otherwise, the control unit inverts the phase of one of the received signals prior to passing both received signals to the summer. In either case, the signals applied to the summer have in-phase components and the magnitude of their sum is thus greater than the magnitude of either received signal alone.

BRIEF DESCRIPTION OF THE DRAWINGS

The above and further advantages of the invention may be better understood by referring to the following description in conjunction with the accompanying sole drawing, i.e., Figure, which is a block diagram representation of a mobile transceiver that incorporates a space diversity arrangement in accordance with the invention.

DETAILED DESCRIPTION OF ILLUSTRATIVE EMBODIMENTS

Figure 1:
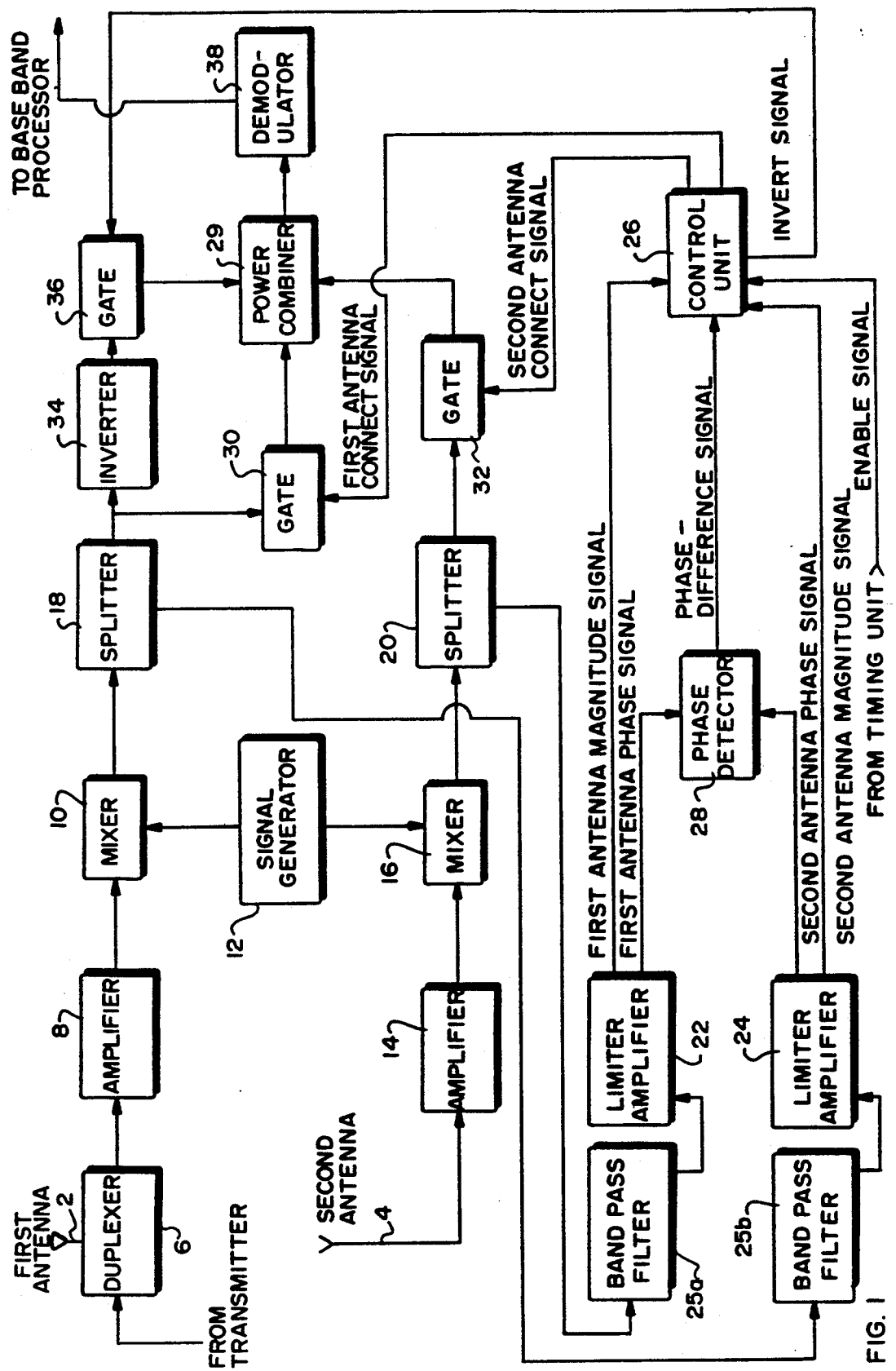

As shown in the drawing, a transceiver incorporating the invention includes a first antenna 2 and a second antenna 4. The antenna 2 is used for both transmission and reception of RF signals and the antenna 4 is used only for reception. The antennas are separated so that fading on either antenna is not correlated.

A duplexer 6 passes the received signals from the antenna 2 to an RF amplifier 8. The amplified signal is then applied to a mixer 10 which also receives the output of a signal generator 12. The mixer 10 shifts the frequency of the received signal to provide a first intermediate frequency signal. Similarly, the signal received by the antenna 4 is presented to an RF amplifier 14 and a mixer 16 to provide a second intermediate frequency signal.

The outputs of the mixers 10 and 16 are sampled by splitters 18 and 20, respectively, to provide inputs for a pair of limiter amplifiers 22 and 24 by way of band pass filters 26 and 28. Each limiter amplifier 22 and 24 provides a magnitude signal indicative of the magnitude of its input signal and a phase signal indicative of the phase its input received signal. A control unit 26 receives the magnitude signals. A phase detector 28 provides a phase difference signal indicative of the phase difference between the phase signals.

Based on the magnitude signals and the phase difference signal, the control unit 26 then determines whether and how to combine the received signals. Specifically, if the ratio of the magnitude signals is equal to or greater than a threshold level, e.g., 5 db, the control unit 26 selects only the received signal having the greatest magnitude. That is, the control unit 26 provides a linear combiner or summer 29 with the received signal having the greatest magnitude by asserting a connect signal which enables gate 30 or 32 to pass the received signal from the splitter 18 or 20 to the power combiner 29. The output of the combiner 29 is fed to a demodulator 38 whose output is applied to conventional circuitry not shown in the drawing.

If the ratio of the magnitude signals is less than the threshold level, the control unit 26 causes the combiner 29 to combine the received signals. Specifically, if the absolute value of the phase difference of the received signals, as indicated by the output of the phase detector 28, is equal to or less than 90°, the control unit 26 provides both received signals to the power combiner 29 by asserting both connect signals and thereby enabling both the gates 30 and 32. Otherwise, the control unit 26 provides one received signal and one inverted received signal to the combiner by asserting, respectively, the connect signal and an invert signal. The invert signal enables a gate 36 to pass the signal from the splitter 18 to the power combiner 29 after phase inversion by an inverter 34. The input to the combiner thus have in-phase components and their sum is thus greater than either of the individual signals.

Although FIG. 1 does not show the second antenna branch as having the capacity to invert the received signal, it should be obvious to one skilled that the discussion above could equally apply to the second antenna branch or both branches a having the capacity to invert their respective received signals.

Finally, a time division multiple accessing scheme has been proposed for use with this invention. A time division multiple accessing arrangement would divide each channel into frames. Each time frame being subdivided into a number of time slots and each user being assigned one time slot for transmitting and one for receiving. Applying this concept to this invention, the timing unit provides a timing signal to the control unit 26 that causes the control unit 26 to inhibit the gates 30, 32, and 36 during every time slot except the assigned time slot for signal reception.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. In a space diversity reception system for receiving signals in a communication device including first and second antennas, a first source coupled with said first antenna for supplying a first signal, a second source coupled with said second antenna for supplying a second signal, said first and second signals having respective magnitudes and phases, and a selection and combining system for providing downstream circuitry with a composite intermediate frequency signal, said received signals being subject to multi-path fading, said selection and combining system comprising:

A) means for generating a first magnitude signal indicative of the magnitude of said first signal;
   B) means for generating a second magnitude signal indicative of the magnitude of said second signal;
   C) means for generating a first phase signal indicative of the phase of said first signal;
   D) means for generating a second phase signal indicative of the phase of said second signal;
   E) a phase detector responsive to said first and second phase signals for generating a phase difference signal indicative of the phase difference between said first and second signals, wherein the absolute value of the phase difference between said first and second signals can be greater than or less than ninety degrees;
   F) linear combining means; and
   G) means coupled with said first and second signal sources, said first- and second magnitude-signal-generating means, and said phase detector, and responsive to said first and second magnitude signals and said phase difference signal, for
      i) applying only said first signal to said combining means when (a) the ratio of the magnitudes of said first and second signals is equal to or greater than a preset magnitude level and (b) the magnitude of said first signal is greater than the magnitude of said second signal,
      ii) applying only said second signal to said combining means when (a) the ratio between the magnitudes of said first and second signals is equal to or greater than the preset magnitude level and (b) the magnitude of said second signal is greater than the magnitude of said first signal, and
      iii) applying said first signal and said second signal to said combining means when (a) the ratio of the magnitudes of said first and second signals is less than the preset magnitude level and (b) the absolute value of the phase difference between said first and second signals is less than ninety degrees; and
   I) wherein said combining means generates said composite intermediate frequency signal from, without requiring co-phasing of, said first and second signals.

2. The selection and combining system of claim 1, wherein the control means further responds to a receiver inhibit signal by disabling said combining means.

3. The selection and combining system of claim 1 wherein the preset magnitude level is 5 db.

4. The selection and combining system of claim 1, wherein each of said means for generating the magnitude signals comprises:

A) a band pass filter coupled with an associated one of said signal sources for passing an associated one of said first and second signals in a desired frequency band; and
   B) an amplifier for limiting the magnitude of the signal passed by the filter and providing a magnitude signal indicative of said magnitude.

5. The selection and combining system of claim 1, further comprising an inverter coupled with said first signal source for inverting the phase of said first signal, thereby generating an inverted signal; and wherein said applying means is coupling with said inverter for applying both said inverted signal and said second signal to said combining means when (a) the ratio between the magnitudes of said first and second signals is less than the preset magnitude level and (b) the absolute value of the phase difference between said first and second signals is greater than or equal to ninety degrees.

6. In a space diversity reception system for receiving signals in a communication device and including first and second antennas, a first source coupled with said first antenna for supplying a first signal, a second source coupled with said second antenna for supplying a second signal, said first and second signals having respective magnitudes and phases, and a selection and combining system for providing downstream circuitry with a composite intermediate frequency signal, said signals being subject to multi-path fading said selection and combining system comprising:
 A) means for generating a first magnitude signal indicative of the magnitude of said first signal;
 B) means for generating a second magnitude signal indicative of the magnitude of said second signal;
 C) means for generating a first phase signal indicative of the phase of said first signal;
 D) means for generating a second phase signal indicative of the phase of said second signal;
 E) a phase detector responsive to said first and second phase signals for generating a phase difference signal indicative of the phase difference between said first and second signals, wherein the absolute value of the phase difference between said first and second signals can be greater than or less than ninety degrees;
 F) linear combining means; and
 G) control means coupled with said first- and second-magnitude-signals-generating means and said phase detector and responsive to said first and second magnitude signals and said phase difference signal for generating a control signal indicative of the ratio of the magnitudes of said first and second signals and indicative of the phase difference therebetween;
 H) means coupling with said first and second signal sources and said control means and responsive to said control signal for
  i) applying only said first signal to said combining means when said control signal indicates that (a) the ratio of the magnitudes of said first and second signals is equal to or greater than a preset magnitude level and (b) the magnitude of said first signal is greater than the magnitude of said second signal,
  ii) applying only said second signal to said combining means when said control signal indicates that (a) the ratio between the magnitudes of said first and second signals is equal to or greater than the preset magnitude level and (b) the magnitude of said second signal is greater than the magnitude of said first signal, and
  iii) applying said first signal and said second signal to said combining means when said control signal indicates that (a) the ratio of the magnitudes of said first and second signals is less than the preset magnitude level and (b) the absolute value of the phase difference between said first and second signals is less than ninety degrees; and
 I) wherein said combining means generates said composite intermediate frequency signal from, without requiring co-phasing of, said first and second signals.

7. The selection and combining system of claim 6, further comprising an inverter coupled with said first signal source for inverting the phase of said first signal, thereby generating an inverted signal, and wherein said gate means is coupling with said inverter for coupling both said inverter and second signal source to said combining means for applying both said inverted signal and said second signal to said combining means when said control signal indicates that (a) the ratio between the magnitudes of said first and second signals is less than the preset magnitude level and (b) the absolute value of the phase difference between said first and second signals is greater than or equal to ninety degrees.

8. The selection and combining system of claim 7, wherein said control means generates a plurality of control signals, including a first antenna connect signal, a second antenna select signal, and an invert signal; and wherein said gate means includes:
 A) first gate means coupled with said first signal source and responsive to said first antenna connect signal for selectively passing said first signal to said combining means,
 B) second gate means coupled with said second signal source and responsive to said second antenna connect signal for selectively passing said second signal to said combining means, and
 C) third gate means coupled with said inverter and responsive to said invert signal for selectively passing said inverted signal to said combining means.

9. The selection and combining system of claim 6, wherein each said magnitude-signal-generating means comprises:
 A) a band pass filter coupled with an associated one of said signal sources for passing an associated one of said first and second signals in a desired frequency band; and
 B) means coupled with said filter and responsive to said passed signal for generating a magnitude signal indicative of the magnitude thereof.

* * * * *